Dec. 27, 1966  W. A. FOLL  3,294,609
METHOD OF MAKING A LAMINATED PLASTIC TUBE
Filed Oct. 17, 1960
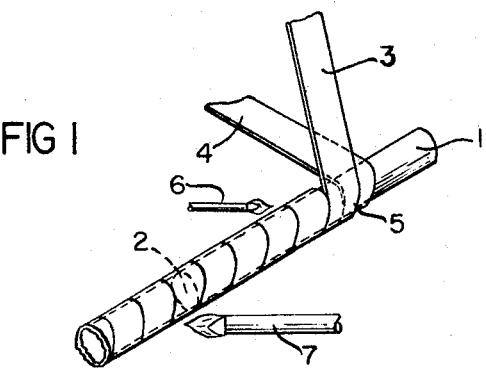
FIG 1
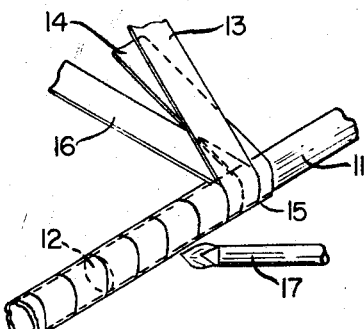
FIG 2
FIG 4
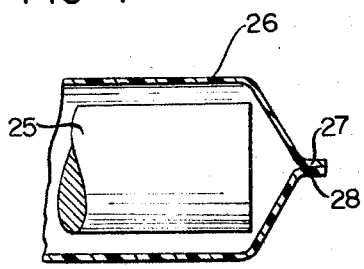
FIG 3
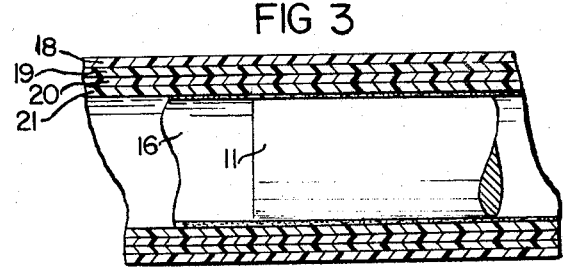
FIG 5
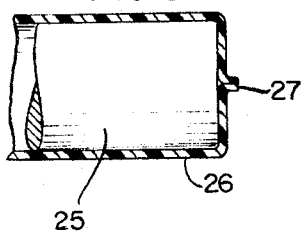
FIG 6
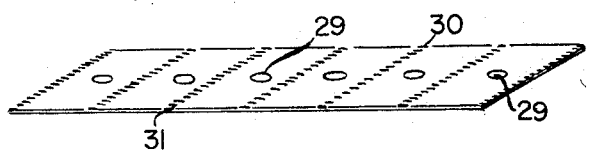
INVENTOR.
WILLIAM A. FOLL
BY
Oberlin, Maky & Donnelly
ATTORNEYS

United States Patent Office 3,294,609
Patented Dec. 27, 1966

3,294,609
METHOD OF MAKING A LAMINATED PLASTIC TUBE
William A. Foll, Cleveland, Ohio, assignor, by mesne assignments, of one-half to Albin M. Hancik, Lakewood, Ohio, and one-half to William A. Foll, Cleveland, Ohio
Filed Oct. 17, 1960, Ser. No. 63,112
1 Claim. (Cl. 156—190)

This invention relates, as indicated, to a heat sealable tube and method of making the same, and more particularly to laminated tubing constructed of plastic materials, the inner plastic material in such tubing being heat sealable to itself whereby the tube may be closed to form a hermetically sealed container.

In laminated tubing construction, it is extremely difficult to embody within such tube a laminated ply employing dissimilar plastic materials. This is especially true if only one of the laminae of the tube structure shrinks on heating such that the tube possesses the capacity of encapsulating objects placed therewithin. It has been extremely difficult to produce such a tube that will shrink without having the laminae of the structure separate, blister or pucker. As an example of such tube structure, reference may be had to the copending application of Albin M. Hancik, entitled "Laminated Tube Structure and Method," Serial No. 847,329, filed October 19, 1959, now Patent No. 3,037,529.

In tubes of this nature, the heat sealable polyethylene is placed between inner and outer layers of a Mylar plastic, the polyethylene serving, when heat sealed, to form a laminated plastic tube coated interiorly and exteriorly with Mylar and provided with heat sealable polyethylene between such coatings. However, it has heretofore been considered impossible to provide an inner layer or coating of polyethylene or other heat sealable material such that the tubing could be employed merely by flattening the same to provide hermetic containers for electrical components or the like.

It is accordingly a principal object of my invention to provide a spiral wound plastic tube having an inner layer of heat sealable polyethylene, such tube being sealed with heat only.

It is a further object of my invention to provide a plastic tube structure which may readily be employed to encapsulate articles, hermetically sealing the same and provide a strong dielectric coating therefor.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail certain illustrative embodiments of the invention, these being indicative, however, of but a few of the various ways in which the principles of the invention may be employed.

In said annexed drawing:

FIG. 1 is a schematic diagram of one method and apparatus that may be employed to produce my laminated plastic tubing;

FIG. 2 is a similar schematic diagram of a second method and apparatus that may be employed to produce such tubing;

FIG. 3 is a fragmentary sectional view of the tube produced by the method shown in FIG. 2 as such tube leaves the mandrel;

FIGS. 4 and 5 illustrate a manner in which my tubing may be employed to encapsulate an article as, for example, an electrical component such as a resistor or capacitor; and FIG. 6 is an illustration of a further manner in which my tube may be employed as a means to package small articles.

Referring now to FIG. 1, there is illustrated schematically the tube winding apparatus which includes a mandrel 1 terminating at 2. About such mandrel two plastic strips 3 and 4 are spiraled and lapped in a conventional manner at an angle to the axis of the mandrel, the plastic strip 4 being the inner strip and the strip 3 being the outer strip, as clearly shown in FIG. 1. In conventional tube winding apparatus an associated drive mechanism (not shown) is employed to rotate the formed tube to draw the strips 3 and 4 from associated supply rolls. Such driving apparatus may take the form of contact rolls or belts wrapped around such tube both to drive and compress the layers against the mandrel. This type of mechanism is well established in the art and it is believed that a detailed showing and description of the driving mechanism is not necessary to an understanding of the present invention.

In the FIG. 1 method embodiment, the strip 3 may, for example, be a laminate of a thermoplastic and a thermosetting material. It may contain a top layer of a thermosetting material (i.e., heat shrinkable) such as Mylar, which is polyethylene terephthalate, such material being produced by the Polychemicals Division of E. I. du Pont de Nemours & Co., Inc., Wilmington, Delaware. Such material is an oriented modified polyester film provided in the esterification reaction between a polyhydric alcohol and a polybasic acid and is commercially available in thicknesses ranging, for example, from .00025" to .0075".

The inner lamina of strip 3 is a thermoplastic resinous material (i.e., heat flowable) and may, for example, be polyethylene, various polyvinyl resins, etc., such being available from a number of commercial producers as, for example, Du Pont, etc. Thus, the strip or web 3 may, for example, be a Mylar film with a layer of polyethylene bonded thereto and such films are also commercially available from the Dobeckmun Company, which is a division of the Dow Chemical Company, in Cleveland, Ohio. The polyethylene layer or film becomes plastic in the range of 180 to 230° F., while the Mylar film has a reorientation temperature substantially higher, i.e., approximately 350 to 450° F.

The strip 4 is a similar laminate of a thermosetting and thermoplastic material, only this sheet has laminae of such thermoplastic resinous material as, for example, polyethylene, on both sides of a central film of such thermosetting material as, for example, Mylar. As can be seen, the webs 3 and 4 are wound in such a manner as to overlap, as at 5, such that the edge of the web 4 will be approximately in the middle of the overlapping strip 3.

As shown at 6, a small amount of heat is provided the tube on the mandrel 1 sufficient to cause the contacting layers of such thermoplastic material on the strips 3 and 4, i.e., polyethylene, to soften to an extent to hold the tube in its wrapped tubular configuration. This source of heat may take the form of a small gas or like flame, as shown, or such may be provided with heat lamps, electrical resistance elements, etc. The temperature provided should be on the lower side of the softening range of 180 to 230° F. and since the tube will be moving rather rapidly past the heating source 6, such heat will not be sufficient to cause a softening of the inner layer of the thermoplastic material on the sheet 4 such that it will cause the tube to adhere to the mandrel 1. It will be understood that the heat will not effect a complete heat seal between the strips 3 and 4, but only such a softening of the thermoplastic material to cause the layers to stick sufficiently to maintain their tube form once leaving the mandrel 1. After such tube has left the mandrel or extended beyond the mandrel end shown at 2, a further heat source 7 is provided to apply the final heat to cause the contacting layers of thermoplastic material on strips 3 and 4 to soften, forming a complete heat seal between strips 3 and 4. Thus, the strips 3 and 4 are adhesively united by heating the spirally arranged strips to the aforementioned range of 180 to 230 degrees F. This heat is applied to the tube beyond the mandrel such that the inner layer of thermoplastic material laminated to the sheet 4 will not adhere to the mandrel 1. This heating temperature range is, of course, well below the reorientation temperature of the Mylar and is ineffectual to shrink such material.

Now referring to FIG. 2, I have illustrated a further embodiment wherein such tube may be produced on mandrel 11, which terminates at 12, and has wrapped thereon laminated sheets 13 and 14 which are identical to strips 3 and 4 in the FIG. 1 embodiment. These sheets 13 and 14 are overlapped, as shown at 15, with the edge of the lower or inner sheet 14 lying approximately in the middle of the sheet 13. In addition to the two plastic laminated sheets 13 and 14, I wrap on such mandrel an inner layer of material which may, for example, be kraft paper, glassine or other type of ply material to which the heated inner layer of thermoplastic material on the laminate 14 will not readily adhere. This type of ply material, shown at 16, thus provides a coating for the mandrel 11 to preclude the polyethylene on the bottom of strip 14 from adhering thereto. A source of heat 17 is provided heating both the bottom and the intermediate layers of the thermoplastic polyethylene while on the mandrel to adhere the sheets 13 and 14 together to form such plastic tube, such plastic tube having the inner coating 16 or kraft paper or the like. This inner coating is known in the trade generally as a "pull sheet" when employed with the gluing of paper tubes or the like and it may readily be removed or pulled from the center of the tube after such tube comes off the mandrel.

The top ply 13, of course, includes the outer layer of the thermosetting material 18 (see FIG. 3) and the intermediate layer of the thermoplastic material 19, which is formed from the facing layers of thermoplastic material on both of the plies 13 and 14. The next layer is again such thermosetting material 20 with the final layer 21 being again such thermoplastic material. The inner "pull sheet" 16 serves as a protective coating for the mandrel 11 and will, of course, be removed in a conventional manner. Thus, in the illustrated embodiment, four distinct and separate layers of thermoplastic and thermosetting materials are produced by the above-described winding operations, it being readily understood that the tube produced in the FIG. 1 embodiment will be exactly the same as the tube shown in FIG. 3, with the exception of the pull sheet 16. The tubes produced in the FIG. 1 and FIG. 2 embodiment will be severed in the conventional manner as they come off the mandrel to produce tube units of any desired length.

Referring now to FIGS. 4 and 5, I have illustrated how my plastic tubing may be employed as a protective covering as, for example, for insulation of various electrical components, such as condensers, coils, terminals, etc. The condenser or like element 25 may be placed within a tube 26 and the end of such tube flattened, as shown at 27. Such flattening operation may be accomplished by heated elements such that the innermost layer of thermoplastic material 21 will cause the inner tube walls to adhere to each other, as shown at 28. The entire structure is then heated to cause the reorientation or shrinkage of the thermosetting material. Since in the illustrated embodiment the reorientation temperature of the Mylar is considerably higher than the softening range of the polyethylene, the shrinking of the Mylar will not disturb the polyethylene laminae in that the flowability thereof will readily accommodate the change in size of the Mylar. As shown in FIG. 5, the tube will then encapsulate the element 25 with the innermost layer of polyethylene flowing about the element to provide a complete hermetic seal closely conforming to the element.

FIG. 6 illustrates a further manner in which my tube may be employed to package elements as, for example, small circular objects 29, which may be pills, transistors, capacitors, medicaments, etc. The elements may be spaced longitudinally inside the tube and the same flattened and heat sealed by heated elements between the objects, as shown at 30 and 31, thus to provide a complete hermetic seal for the objects therein. In the case of electrical components, such as, transistors or capacitors, the entire tube may then be heated to reorient and thus shrink the thermosetting material so that the tube closely conforms to and insulates the packaged elements.

The tubes may be made of any size desired as, for example, the laminae may be ½" wide and wound to an inside diameter of $\frac{5}{16}$". The tube ends, as shown at 27, may be subjected to a heat of about 275° F. to seal the ends and the entire object subjected to a heat of about 400° F. to shrink and encapsulate the elements. It will be understood that thermoplastic materials as, for example, irradiated polyethylene may be employed as the heat shrinkable material where shrinkage in only one direction is desired.

Whereas I have illustrated tubes made of only two strips or plies of the laminated Mylar-polyethylene material, it will be understood that more may be employed with the intermediate and inner plies being coated on both sides. Thus, in a three ply tube, the center ply will also have polyethylene on both sides. In a single strip or ply tube, the laminated polyethylene on the inside of the ply will serve both to coat the interior of the tube and adhere the overlapped convolutions of the ply together.

It has been found that tubes of the type shown have such high tensile strength that such may be used in place of ropes and, in fact, it has been proposed that a tube of approximately 1" diameter could be flattened and rolled up for use as a packaged tow rope for automobiles. It can thus be readily seen that with tubes of this type, hermetic casings and containers that are extremely durable may be provided, such containers additionally providing very desirable electrical insulation properties.

It will, of course, be understood that the heat seal may be provided on the exterior of the tube. Thus an exterior coating of polyethylene may be heat sealed to the interior coating of polyethylene on a lapped tube of slightly larger diameter to provide a lap joint between two tubes to produce a tube that is heat sealable on the outside.

It will now be seen that I have devised a method whereby the principal object of my invention, to provide a wound plastic tube having an inner layer of heat sealable polyethylene, is accomplished.

Other modes of applying the principle of the invention may be employed, change being made as regards the details described, provided the features stated in the following claim or the equivalent of such be employed.

I, therefore, particularly point out and distinctly claim as my invention:

The method of making a heat sealable plastic tube comprising the steps of wrapping a removable protective pull sheet about a mandrel, wrapping a first laminated strip having inner and outer layers of a heat flowable plastic material selected from the group consisting of polyethylene and polyvinyl resins and an intermediate layer of a heat shrinkable plastic material selected from the group consisting of polyethylene terephthalate and irradiated polyethylene about said sheet, wrapping a second laminated strip having a layer of heat shrinkable plastic material selected from the group consisting of polyethylene terephthalate and irradiated polyethylene and an inner layer of heat flowable plastic material selected from the group consisting of polyethylene and polyvinyl resins about said first strip in overlapping spiraled relationship therewith to form a tubular structure, heating said tubular structure above the softening temperature of said seat flowable plastic material but below the shrinking temperature of said heat shrinkable plastic material to bond said strips into a unitary article, said pull sheet preventing said heat flowable plastic material when in the softened condition from adhering to said mandrel, removing said article from said mandrel, and subsequently removing said pull sheet from said article.

References Cited by the Examiner

UNITED STATES PATENTS

| | | | |
|---|---|---|---|
| 1,595,856 | 8/1926 | Clark | 156—84 X |
| 2,181,035 | 11/1939 | White | 156—190 X |
| 2,402,038 | 6/1946 | Goldman et al. | 156—190 |
| 2,564,602 | 8/1951 | Hurst | 138—125 |
| 2,614,058 | 10/1952 | Francis | 154—83 |
| 2,630,394 | 3/1953 | Atwood | 156—84 X |
| 2,690,769 | 10/1954 | Brown | 138—125 |
| 2,713,383 | 7/1955 | Kennedy | 156—86 |
| 2,760,549 | 8/1956 | Nash et al. | 156—188 X |
| 2,877,150 | 3/1959 | Wilson | 154—83 |
| 2,953,418 | 9/1960 | Runton et al. | 156—85 X |
| 2,993,820 | 7/1961 | Marshall | 156—84 |
| 3,037,529 | 5/1962 | Hancik | 156—85 |

EARL M. BERGERT, *Primary Examiner.*

E. V. BENHAM, *Examiner.*

L. G. FOSTER, P. DIER, *Assistant Examiners.*